Jan. 25, 1966     D. Z. TYSON ETAL     3,230,581
RUBBER MIXER
Filed Jan. 6, 1964                                             2 Sheets-Sheet 1
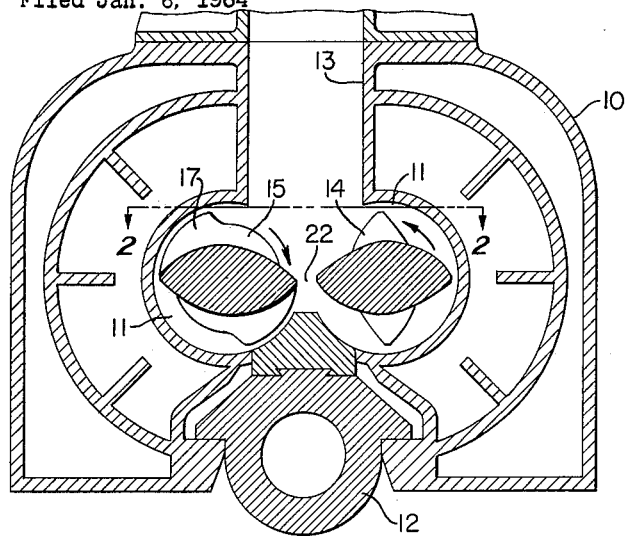
FIG. 1
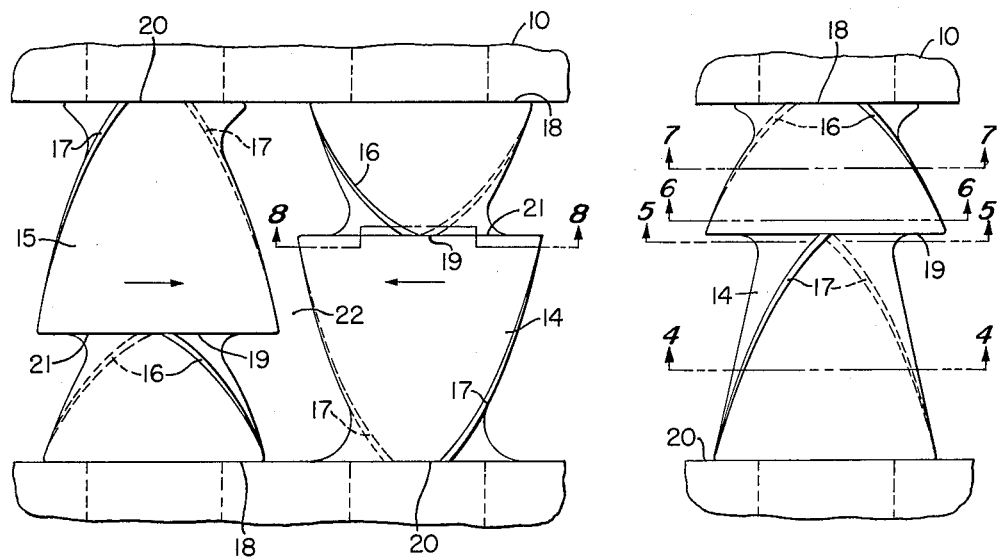
FIG. 2                  FIG. 3
*INVENTOR.*
DAVID Z. TYSON
BY  LOUIS F. COMPER
*J. B. Holden*
ATTORNEY Jan. 25, 1966    D. Z. TYSON ETAL    3,230,581
RUBBER MIXER Filed Jan. 6, 1964    2 Sheets-Sheet 2

INVENTOR.
DAVID Z. TYSON
BY LOUIS F. COMPER

*J. B. Holden*
ATTORNEY

United States Patent Office 3,230,581
Patented Jan. 25, 1966

3,230,581
RUBBER MIXER
David Z. Tyson, Akron, and Louis F. Comper, Mogadore, Ohio, assignors to The Goodyear Tire & Rubber Company, Akron, Ohio, a corporation of Ohio
Filed Jan. 6, 1964, Ser. No. 335,746
10 Claims. (Cl. 18—2)

This invention relates to mixers for rubber and like materials and, more particularly, to such mixers of the Banbury type having the provision of a novel form of mixing rotors.

Mixers of the Banbury type comprise what is usually referred to as a double cylindrical chamber, the chamber consisting of two cylinders placed side by side with their axes in parallel horizontal relationship and the cylinders communicating with each other at their adjacent portions lying between their axes. A rotor is provided in each of the cylinders. The rotors are counter-rotating and provided with blades or vanes, the tips of which closely approach the walls of the respective chamber cylinders. Each rotor has at least two vanes one of which extends axially a substantially greater distance than the other vane. The vanes are diametrically located relative to each other at their plane of juncture with the long and short vanes helically disposed in opposite directions relative to the axis of the rotor. Thus, as the rotors rotate, the stock in the chamber is moved by the respective vanes back and forth within the chamber as well as vertically across the chamber walls and downwardly between the rotors. This particular flow of the stock in the chamber characterizes a Banbury mixer.

Conventional rotors for Banbury mixers have an even number of vanes which have a uniform cross section throughout the axial extent of the vanes. Such rotors having four vanes simply have not homogeneously mixed stock. Applicants have discovered that rubber stock is homogeneously mixed with four vane rotors in much less time and the mixing efficiency is increased by decreasing the cross-sectional area of the four vanes at the inboard end thereof so as to permit unrestricted flow of stock across the juncture of the long and short vanes of the rotor.

Accordingly, it is an object of this invention to overcome the disadvantages of prior machines of the type described and, more specifically, to provide a rotor for Banbury type rubber machines which homogeneously mixes stock and vastly reduces the mixing time of the mixer.

A further object of the invention is to provide a mixer of the Banbury type having rotor vanes which vary in cross-sectional area and contour at the inboard end to provide an unrestricted flow of material and thereby vastly reduce the mixing time and improve the efficiency of the mixer.

These and other objects of the invention will become more apparent when read in conjunction with the following description and the accompanying drawings, in which;

FIG. 1 is a cross-sectional view of a mixer for rubber or like material embodying the invention with some parts broken away and in cross section;

FIG. 2 is a longitudinal sectional view taken along the lines 2—2 of FIG. 1 with some parts broken away;

FIG. 3 is a view similar to FIG. 2 but in side elevation;

Figure 4:
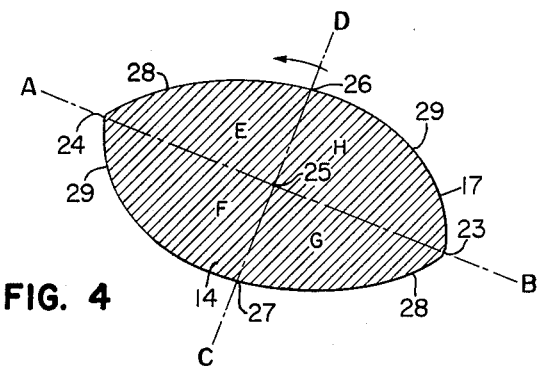
FIGS. 4 through 8 are cross-sectional views taken across the indicated sectional lines of FIG. 2 and FIG. 8.

To illustrate the preferred form of this invention, a mixer for rubber or like material, known as a Banbury mixer, comprises a frame or body 10 having a double cylindrical mixing chamber 11, a lower discharge door 12 and a charging channel or chute 13. In each of the cylinders of the mixing chamber 11 is, respectively, supported a rotor 14 and 15 which are counter-rotating in a direction such that when viewed from above, the rotors rotate towards each other as indicated by the arrows in FIGS. 1 and 2. The distance between the centers of rotation of each of the rotors is slightly greater than the maximum diameter of the rotors so that there is adequate clearance between the vanes thereof. The rotor 14 is of identical construction to the rotor 15 except that the rotor 14 is right-handed and the rotor 15 is left-handed.

The short vanes 16 of the rotors extend in a helical path to move the stock away from the outboard or axially outer end 18 toward the inboard end 19 of the short vanes. Likewise, the long vanes 17 on the rotors extend in a helical path to move the stock away from the outboard or axially outer end 20 toward the inboard or axially inner end 21 of the long vanes. In other words, each of the short vanes on the rotors move the stock towards the long vanes on the same rotor and vice versa. The short vanes 16 on the rotor 14 are adjacent the long vanes 17 on the other rotor 15 and vice versa so that the long vanes 17 of each rotor overlap each other axially in the area 22.

FIG. 4 of the drawing shows the cross-sectional shape of the rotor 14 taken along the lines 4—4 of FIG. 3. The rotor tips 23 and 24 are slightly flattened and, as previously indicated, have a tip diameter measured from tip 23 to 24 slightly less than the diameter of the cylinders of the chamber 11. The axis AB extending through the tips 24 and 23 and the center of rotation 25 of the rotor will be referred to as the major axis of the rotor cross section. The minor axis of the cross section CD extends at right angles to the major axis AB through the center of rotation of the rotor. The distance from the root 26 to the root 27 measured along the minor axis CD is the root diameter. Thus, the major and minor axes divide the cross section of the rotor into four quadrants E, F, G and H. The sectional area of the rotor in the in the quadrant E, defined by 24, 25 and 26 is identical to the sectional area in the quadrant G, defined by 27, 25, and 23. The outer periphery of each of quadrants E and G is formed by the trailing side 28 of each vane 16 and 17. Likewise, the sectional area of the quadrants F and H are the same and include the leading side 29 of each of the vanes. The leading side 29 of the vane 16 has a substantially lesser radius of curvature than the trailing side 28 of each of the vanes.

Figure 7:
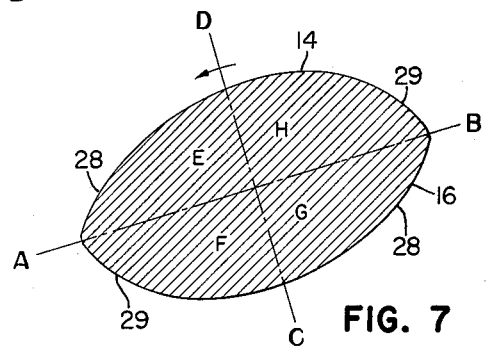

As seen in FIG. 7, the cross-sectional shape of the short vane portion of the rotor is identical to that of the long vane portion of the rotor except that due to the helically extending direction of the vanes, the major and minor axes are displaced circumferentially.

The inboard ends 19 and 21 of the vanes terminate in or adjacent to a plane of juncture which is normal to the axis of rotation of the rotor at the inboard ends 19 and 21 of the vanes. Both the long vanes and short vanes have a variable cross-sectional area and contour from the inboard end toward the outboard end for a minor portion of the axial length of the vanes. Preferably, the area and contour varies from the inboard end 19 of the short vanes 16 for approximately one-third of the length of the length of the short vanes, and one-sixth of the length of the long vanes 17. The cross-sectional contour and area of the remainder of each of the short and long vanes is substantially identical and uniformly constant, shown in FIGS. 4 and 7.

Figure 5:
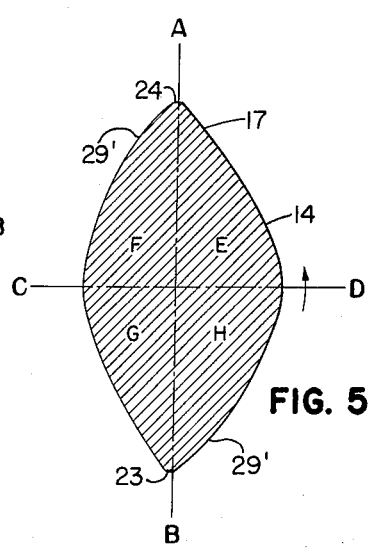
Figure 6:
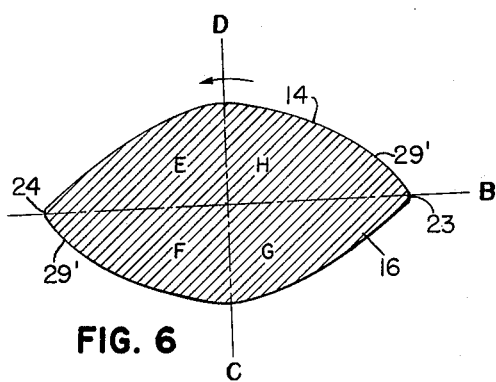
Figure 8:
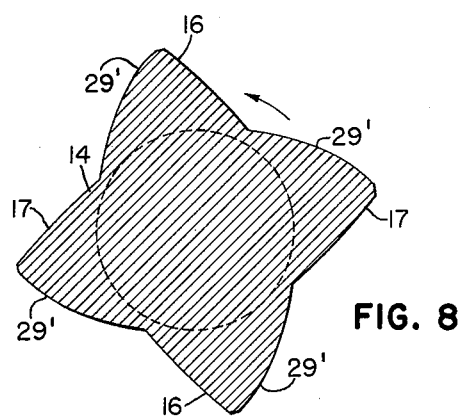
Figure 9:
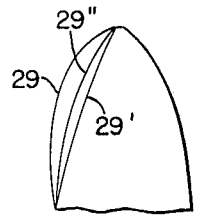
FIG. 9 is a partial cross-sectional view of the rotor of this invention.

FIG. 5 of the drawings shows the cross-sectional shape of the rotor adjacent to the plane of juncture or to the inboard end 21 of the long vanes; and FIG. 6 of the drawings shows the cross-sectional shape at the inboard end 19 of the short vanes. The leading side 29' of the vanes, as shown in FIGS. 5 and 6, has a radius of curvature approximately the same as the trailing side 28 of the vanes and is substantially greater than the radius of curvature of the leading side 29 shown in FIGS. 4 and 7. Therefore, the area of the quadrants F and H, which include the leading side 29' is substantially less than the areas of the sectors F and H shown in FIG. 4 which includes the leading side 29 of the vanes. FIG. 8 is a view which shows a composite cross section of both the long and short vanes at the inboard ends thereof adjacent to the plane of juncture of the short and long vanes. FIG. 9 of the drawings is a view showing superimposed partial sectional contours of the rotor vane. The leading side 29 is as shown in FIG. 4. The leading side 29' is as shown in FIG. 6. The leading side 29'' is as if taken at a section axially intermediate of the rotor sections shown in FIGS. 4 and 6. It is thus seen that the radius of curvature of the leading side 29 of the cross section in the sectors F and H decreases as the distance from the inboard end to the outboard end of the rotor increases. Thus, as the stock is moved by the vanes 16 and 17 toward the inboard ends thereof, the cross-sectional area of the rotor and vanes decreases as the stock approaches the plane of juncture. Therefore, beginning at approximately one-third of the length of the short vanes from the inboard end thereof, and one-sixth of the length of the long vanes from the inboard end thereof, the stock has an increasingly greater volume or void area to occupy. Accordingly, the movement of the stock across the plane of juncture is uninhibited so that the stock is mixed homogeneously and the mixing time for a given batch of stock is decreased and the mixing efficiency increased between 25% and 50%.

While certain representative embodiments and details have been shown for the purpose of illustrating the invention, it will be apparent to those skilled in this art that various changes and modifications may be made therein without departing from the spirit or scope of the invention.

What is claimed is:

1. In an internal mixer of the character described, a pair of counter-rotating parallel rotors, each rotor having a pair of long substantially diametrically opposed vanes extending from one end of the rotor toward the opposite end and a pair of short substantially diametrically opposed vanes extending from the opposite end toward said one end with the inboard ends of the long and short vanes terminating adjacent a common plane which is normal to the axis of rotation of the rotor and is between the rotor ends, the long and short vanes extending in a helical direction relative to the centerline of the rotor to move the stock toward the inboard ends of the vanes, the long vanes of one rotor being adjacent the short vanes of the other rotor, the leading sides of the long and short vanes at the inboard end thereof adjacent said plane having a radius of curvature in cross-section approximately equal to the radius of curvature of the trailing side of said vanes, the said radius of curvature at the inboard end of the leading side of the vanes decreasing as the axial distance from said plane increases.

2. In an internal mixer as claimed in claim 1 in which the radius of curvature of the said leading sides of the short vanes decreases from said plane for a distance of approximately one-third of the axial length of said short vanes.

3. In an internal mixer as claimed in claim 1 in which the radius of curvature of the said leading sides of the long vanes decreases from said plane for a distance of approximately one-sixth of the axial length of said long vanes.

4. In an internal mixer of the character described, a pair of counter-rotating parallel rotors, each rotor having a pair of long substantially diametrically opposed vanes extending from one end of the rotor toward the opposite end and a pair of short substantially diametrically opposed vanes extending from the opposite end toward said one end with the inboard ends of the long and short vanes terminating adjacent a common plane which is normal to the axis of rotation of the rotor and is between the rotor ends, the long and short vanes extending in a helical direction relative to the centerline of the rotor to move the stock toward the inboard ends of the vanes, the long vanes of one rotor being adjacent the short vanes of the other rotor, the cross-sectional area of the quadrant which includes the leading side of the vanes has a cross-sectional area at the inboard end of the rotors which is substantially the same as the said cross-sectional area of the quadrant of the cross-section which includes the trailing side of the vanes.

5. An internal mixer as claimed in claim 4 in which the radius of curvature of the leading side of the vanes increases from a point axially inward of the outboard end of the rotors toward the inboard ends of the vanes.

6. An internal mixer as claimed in claim 5 in which the radius of curvature of the leading side of the short vanes is constant from the outboard ends of the rotors for a distance of approximately two-thirds of the axial length of the portion of the rotors which include the short vanes.

7. An internal mixer as claimed in claim 5 in which the said radius of curvature of the leading side of the long vanes is constant from the outboard end of the rotors for a distance of approximately five-sixths of the axial length of the portion of the rotors which include the long vanes.

8. An internal mixer as claimed in claim 4 in which the cross-sectional area of the quadrant which includes the leading side of the vanes increases for a portion of the axial length of the vanes as the distance from said plane increases.

9. An internal mixer as claimed in claim 8 in which the said area increases for a distance of approximately one-third of the axial length of the portion of the rotors which include the short vanes.

10. An internal mixer as claimed in claim 8 in which the said area increases for a distance of approximately one-sixth of the axial length of the portion of the rotors which include the long vanes.

References Cited by the Examiner
UNITED STATES PATENTS

| | | | |
|---|---|---|---|
| 1,324,170 | 12/1919 | Pletscher | 18—2 |
| 2,820,618 | 1/1958 | Bolling | 259—104 |
| 3,154,808 | 11/1964 | Ahlefeld et al. | 18—2 |

CHARLES A. WILLMUTH, *Primary Examiner.*